INVENTORS.
ALEX A. VERESCHAGIN;
JOHN J. VERESCHAGIN;
BY Kimmel, Crowell & Weaver,
ATTORNEYS.

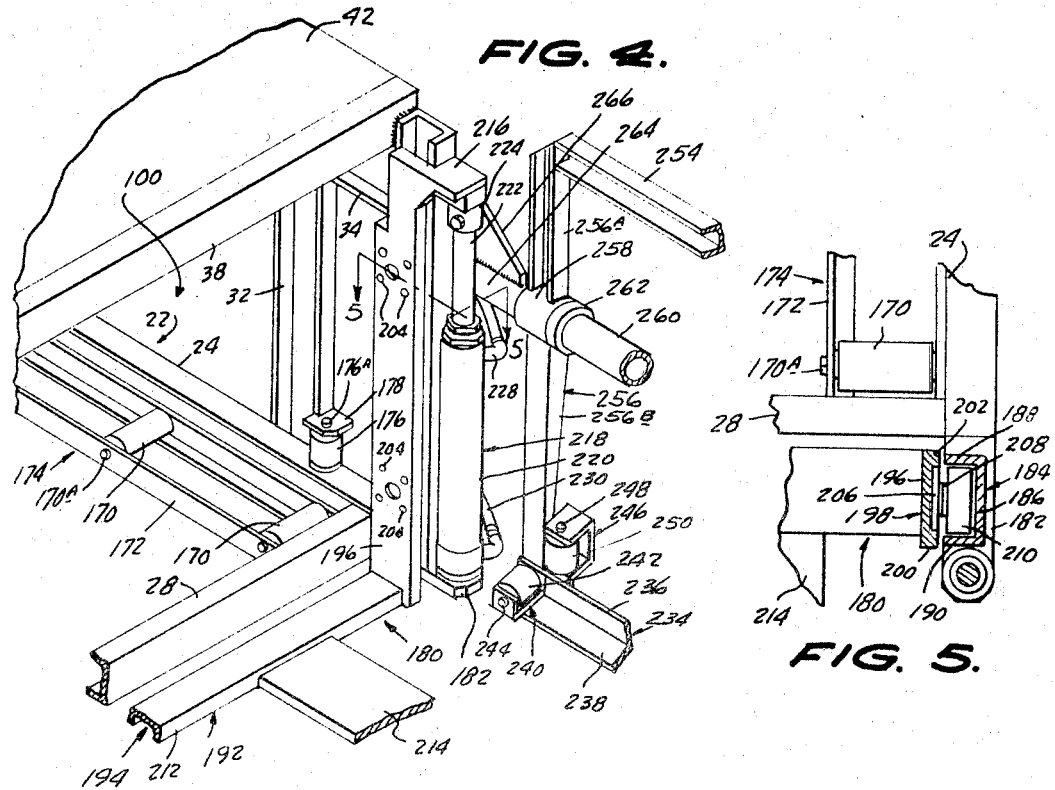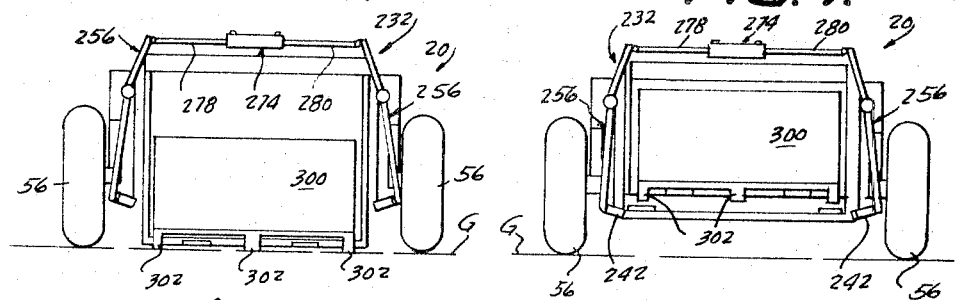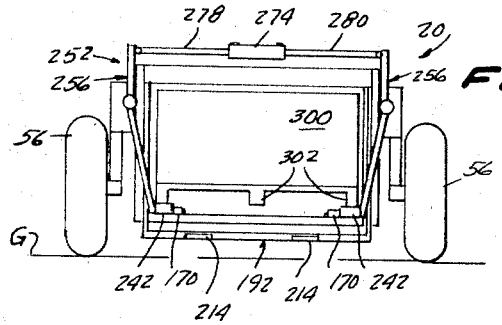

March 11, 1969     A. A. VERESCHAGIN ET AL     3,432,053
AUTOMOTIVE BIN CARRYING MACHINE
Filed June 2, 1967
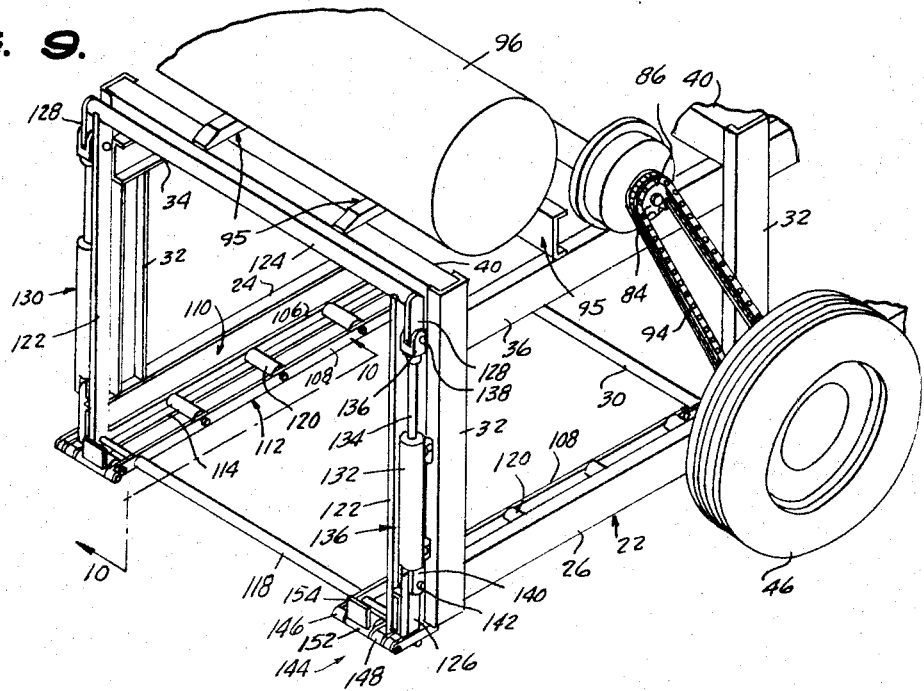
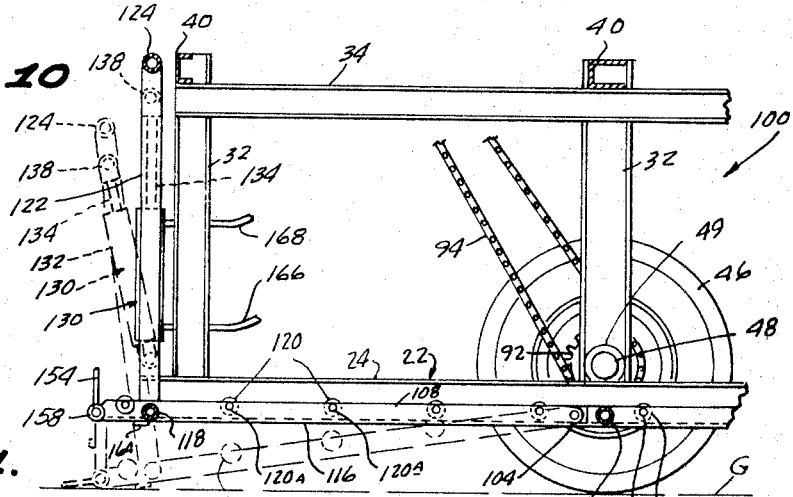
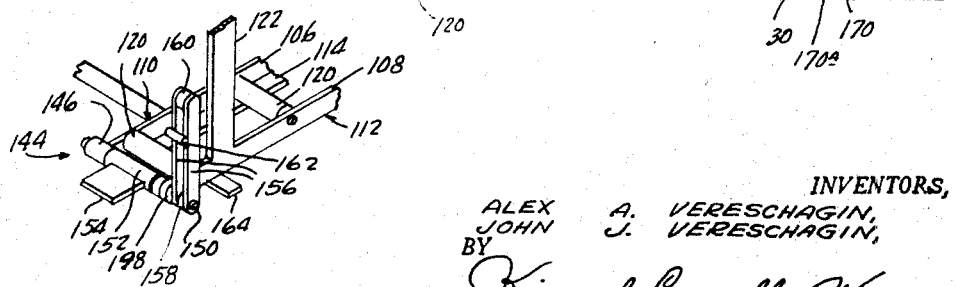
INVENTORS,
ALEX A. VERESCHAGIN,
JOHN J. VERESCHAGIN,
BY
*Kimmel, Crowell & Weaver*
ATTORNEYS.

United States Patent Office 3,432,053
Patented Mar. 11, 1969

3,432,053
AUTOMOTIVE BIN CARRYING MACHINE
Alex A. Vereschagin, 240 E. Shasta St., and John J. Vereschagin, Rte. 1, Box 304–C, both of Orland, Calif. 95963
Filed June 2, 1967, Ser. No. 643,267
U.S. Cl. 214—505              13 Claims
Int. Cl. B60p 1/44; A01d 90/00

ABSTRACT OF THE DISCLOSURE

A wheeled motor driven chassis having a bin receiving compartment formed therein and including fork lift means to elevate a grounded bin into communication with the compartment, and conveyor means movable into engagement with the elevated bin to remove the bin from the forks for transfer into the compartment.

BACKGROUND OF THE INVENTION

The farming industry has long been plagued with difficulties which arise in the handling of fruit bins at harvesting time. For the most part, farmers have had to resort to makeshift apparatus in the apparatus in the handling of heavily loaded bins which, of course, is not only inefficient in operation, but also leads to reduced prices from damage to fruit when the latter finally reaches the market place.

Accordingly, it is one of the primary objects of this invention to provide apparatus especially designed to facilitate the loading of filled fruit bins on mobile means for transport to a remotely located discharge station.

Another object of this invention is to provide an automotive machine including a wheeled chassis having a fruit bin compartment formed therein, together with bin pick-up and conveyor means for loading the compartment with one or a plurality of bins.

A further object of this invention is to provide an automotive machine of the type generally described supra together with gravity operated conveyor means for effecting the discharge of bins loaded within the compartment when the machine has been driven to the discharge station.

This invention contemplates, as a still further object thereof, the provision of an automotive bin carrying machine which is noncomplex in construction and assembly, inexpensive to manufacture and maintain, and which is rugged and durable in use.

Other and further objects and advantages of the instant invention will become more manifest from a consideration of the following specification when read in conjunction with the annexed drawings.

In the drawings:

FIGURE 4 is an enlarged fragmentary perspective view illustrating part of the machine chassis together with a bin fork lift, its hydraulic operating means, and a portion of the front roller conveyor means;

FIGURE 5 is a fragmentary detailed cross sectional view, FIGURE 5 being taken substantially on the horizontal plane of line 5—5 of FIGURE 4, looking in the direction of the arrows;

FIGURE 6 is a partial front elevational view of the machine of FIGURE 1, FIGURE 6 showing the fork lift means in engaging position below a fruit bin and with the side roller conveyor means being disposed to their remote inoperative positions relative to one another;

FIGURE 7 is a view similar to FIGURE 6 but illustrating the position of the component elements of the invention together with the fruit bin upon actuation of the fork lift means;

FIGURE 8 is a view similar to FIGURE 6 showing the front forward conveyor means and transfer relation relative to the fork lift means and with the fork lift means having been moved partially towards its ground engaging position;

FIGURE 9 is a fragmentary enlarged perspective view of the back or rear of the machine and showing the rear roller conveyor means in its raised inoperative position;

Figure 1:
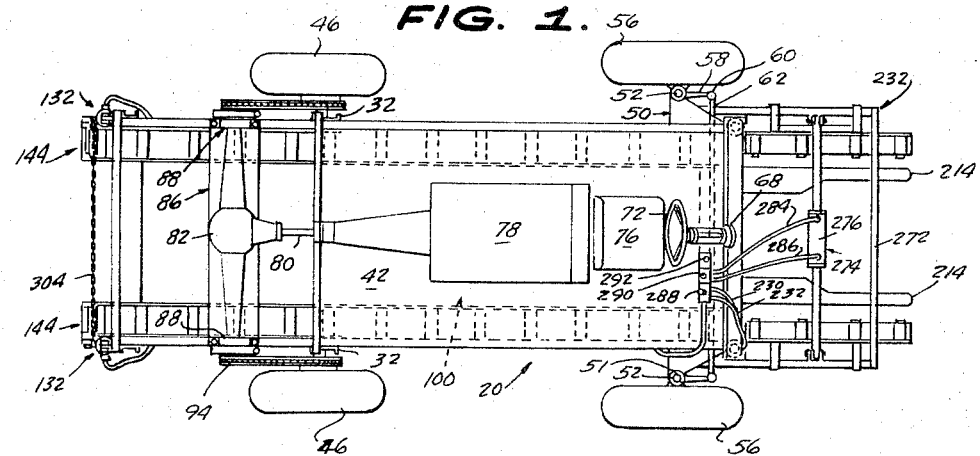
FIGURE 1 is a top plan view of an automotive bin carrying machine constructed in accordance with this invention.

FIGURE 10 is a fragmentary detailed cross sectional view, FIGURE 10 being taken substantially on the vertical plane of line 10—10 of FIGURE 9, looking in the direction of the arrows, FIGURE 10 showing the rear roller conveyor means moved to its operative position in dotted lines; and FIGURE 11 is an enlarged fragmentary perspective view of the bin abutment means carried at the outer terminal ends of the rear or back roller conveyor means.

Referring now more specifically to the drawing, reference numeral 20 designates an automotive bin carrying machine constructed in accordance with the teachings of this invention. As is illustrated in the several figures of the drawings, the machine 20 is seen to comprise an automotive chassis 22 of any suitable construction and which is here illustrated as comprising a pair of elongated laterally spaced and substantially parallel chassis side frame members 24, 26. Extending transversely across the adjacent bar on front ends of the chassis side frame members 24, 26, and rigidly secured thereto, is a rigid front cross frame member 28, and other cross bracing may be provided, as desired, by employing one or more cross rods 30 intermediate the adjacent front and rear pairs of ends of the chassis side frame members 24, 26.

The lower ends of a plurality of upright support elements 32 are fixedly secured to the chassis side frame members 24, 26, at longitudinally spaced intervals, with the support elements 32 on one chassis side frame member confronting in laterally spaced and parallel relationship their respective counterparts on the other of the chassis frame side member. Fixedly connected to each support element 32 on each chassis side frame adjacent to but spaced from the upper ends thereof is an elongated upper chassis side frame member 34, 36 (see FIGURE 9), and the adjacent forward or front ends of the latter are rigidly connected together by a front cross-frame member 38 (see FIGURE 4). Further rigidity is imparted to the structure as by cross braces 40 which extend transversely across the chassis side frame members 34, 36 to which they are rigidly connected by conventional means and with the opposed ends of the cross braces 40 fixedly connected to the upper ends of the support elements 32. Suitable flooring 42 or platform means extends across and is secured to the side frame members 34, 36 (see FIGURES 1 and 4) wherever necessary or convenient.

Still further structural strength is provided to the machine 20, if desired, through the use of the cross-struts 44 (see FIGURE 2) which extend between the lower and upper chassis side frame members 24, 34 and 26, 36, respectively, at each side of the machine 20.

The chassis, as described above, is wheel supported, there being provided a pair of rear wheels 46, each of which is rotatably mounted on an axle 48 (see FIGURE 10) carried in housings 49 fixedly connected on each side frame 24, 26, adjacent the rear ends thereof.

At the forward end of the machine 20 and connected to the adjacent ends of the chassis side frame members 34, 36 is an offset gusset plate assembly 50 (see FIGURES 1, 2 and 3), to each of which is rigidly connected a housing 51 in which is journalled a steering shaft 52 for rotation about a vertical axis. To the lower end of each shaft 52 is fixedly connected a stub axle 54 on which is rotatably channeled the front steering and front support wheels 56. The upper ends of each steering shaft are rigidly connected to one end of a steering lever 58, and the other end of each steering lever 58 is pivotally connected at 60 to, respectively, the opposed ends of a tie rod 62.

Conventional steering means including a disk 64 (see FIGURES 1 and 3), the endless flexible connectors 66, steering drum 68, shaft 70, and manually operated steering wheel 72 are employed to selectively control the chassis steering wheels 56. The steering wheel 72, its shaft 70 and associated drum 68 may be suitably mounted and supported on the upper chassis frame member 38, or the floor of platform 42, as by the standard means 74 (see FIGURES 2 and 3).

Also mounted on the floor or platform 42 in juxtaposition relative to the steering wheel 72 is an operator's seat 76. Disposed rearwardly of the operator's seat 76 is a conventional internal combustion engine 78 which is connected in driving relationship with a drive shaft 80, the latter, in turn, being connected to transmission means 82 which, in the usual manner, drive the oppositely disposed driven axles 84. Any suitable means 86 serve to connect the transmission means 82 on the chassis side frame members 34, 36, it being understood, of course, that suitable journals or bearings 88 (see FIGURES 1, 2 and 9) are provided for the remotely disposed ends of the driven axles 84.

Each remotely disposed end of the driven axles 84 has a sprocket wheel 90 fixedly secured thereto for rotation therewith, the sprocket wheels 90 each being aligned, respectively, with a sprocket wheel 92 fixedly secured on each axle 48, and a driving connection is provided between each adjacent pair of aligned sprocket wheels 90, 92, via the flexible endless sprocket chain 94 which is trained thereabout.

It will be understood that the conventional engine control means (not shown) are disposed within the convenient reach of the operator when the seat 76 is occupied and the machine 20 is being operated. These are conventional and well known in the art and require no elaboration at this point.

Also supported by conventional means 95 on the upper side chassis frame members 34, 36, is a fuel tank 96 and a hydraulic fluid reservoir 98. The latter is adapted for connection in a conventional hydraulic fluid power transmission circuit or system driven by the motor 78 and controlled through valving means 100 all to serve a purpose and function to be described below.

From the foregoing description it will be understood that the lower chassis side frame members 24, 26, their upper chassis side frame member counterparts 34, 36, the support elements 32 and various cross supports and reinforcing elements all cooperate to define a substantially hollow open rectangular compartment 102 and wherein it is especially called to attention that the compartment 102 includes a pair of opposed open front and rear ends.

Behind the cross rod 30 and fixedly secured to each of the side frame members 24, 26 is a laterally projecting stub shaft 104 (see FIGURE 10) on which is pivotally connected the adjacent pair of ends of the side walls 106, 108 of a pair of inwardly and upwardly opening L-shaped brackets 110, 112. The brackets 110, 112 are provided with normally horizontal elongated bottom walls 114, 116, respectively. Extending across the rearmost ends of the L-shaped brackets 110, 112 at each side of the vehicle chassis 22 there is a normally horizontal transversely extending spacer or stringer rod 118 (see FIGURES 9 and 10).

Extending transversely across the pairs of L-shaped brackets 110, 112 at each side of the chassis 22 and rotatably supported on the side walls 106, 108 thereof are a pair of elongated substantially cylindrical rollers 120 which comprise a portion of a conveyor system to be described below.

Referring now more specifically to FIGURES 9 and 10 of the drawings, reference numerals 122 designate a pair of laterally spaced upright substantially parallel and confronting standards each of which has its respective lower end connected, fixedly, on the rearmost ends of the side walls 106. The upper ends of the standards 122 are fixedly secured to a normally horizontal transverse rod 124 adjacent to but spaced inwardly from its respective ends. The projecting ends of the transverse rod 124 overhang in vertically spaced relationship the adjacent ones of the chassis side frame members 24, 26 and the upper ends of a pair of vertically extending substantially rectangular plates 126 which have their respective lower ends fixedly secured to the adjacent ones of the chassis side frame members 24, 26. The plates 126 are normally vertically aligned and substantially parallel to a pair of hanger straps 128 which are fixedly connected to the transverse rod 124 and its opposed ends and which depend therefrom.

Interposed between the plates 126, 128 at each side of the chassis 22 is a conventional hydraulic cylinder 130 which comprises the usual casing 132 which carries the reciprocable piston rod 134. The upper end of each piston rod 134 terminates in a clevis connector 136 which is pivotally connected at 138 on the lower depending end of the adjacent one of the hanger straps 128. The lower end of each casing 132 terminates in longitudinally projecting laterally spaced pairs of lugs 140 which receive the upper ends of the adjacent one of the plates 126 therebetween, and each pair of lugs 140 is pivotally connected by a pivot pin 142 to its associated one of the plates 126.

Back stop or abutment means is provided for each of the chassis side frame members 24, 26 and have here been assigned to general reference 144 (see FIGURES 9 and 11). Each means 144 includes a pair of substantially hollow cylindrical and aligned collars 146, 148 which are fixedly secured to, respectively, the side walls 106, 108 of each of the L-shaped brackets 110, 112 at the opposed sides of the chassis 22. The pairs of collars 146, 148 each receive a substantially cylindrical rod 150 therein, the rods 150 spanning the distance between the side walls 106, 108 of their immediately adjacent pair of brackets 110, 112. Fixedly mounted on each of the pins 150 between the side walls 106, 108 is a barrel 152 from which radially projects a normally upright substantially rectangular stop lug 154.

The collars 148 are each substantially equal in width to the width of their immediately adjacent chassis side frame member 24, 26 and serve as spacers for a pair of elongated laterally spaced and substantially parallel links 156, each pair of links 156 having an adjacent pair of ends thereof fixdly connected on the remotely disposed ends of each of the rods 150, respectively. One pair of ends of the links 156 are held in their spaced relationship by means of a spacer collar 158, and the other ends thereof are held in their respective spaced relationship by means of a similar spacer collar 160. As is clearly seen in FIGURE 11, a substantially cylindrical weight bar 162 is fixedly connected to the links 156 adjacent the collar 160.

The inner ends of each pair of links 156 are rigidly connected to the rod 150 as is each barrel 152 with the longitudinal axes of the links 156 making an obtuse angle A (see FIGURE 10) with the plane of the adjacent one of the radiating lugs 154. The purpose and function of this construction will become apparent as the specification progresses.

With the lugs 154 in their normally upright position as is shown in FIGURE 9 of the drawings, each pair of links 156 engages against and is held against pivotal movement in a counterclockwise direction by the lower ends of the plates 126. In this position, each pair of links 156 also normally engage a stop bar 164 which projects laterally beyond each of the side walls 108 and which is disposed in the pivotal path of movement of the pairs of links 156 to thereby limit the pivotal movement of the same in a clockwise direction, reference again being made to FIGURES 9 and 10.

If it be assumed that the above described component elements of this invention are in their pull line position as is illustrated in FIGURES 9 and 10, it will be understood that hydraulic fluid from a suitable conventional hydraulic fluid system has been admitted through the conduit 166 to the casings 132 to cause the piston rods 134 of the hydraulic cylinders 130 to extend outwardly to their shown positions. Now if it be assumed that the hydraulic fluid system or circuit has been reversed to cause the fluid to enter the conduits 168, this fluid flow will enter the casings 132 and cause the piston rods 134 to move to their retracted positions shown in dotted lines in FIGURE 10.

In so moving, the piston rods 134 pull downwardly on the plates 128 and consequently on the rod 124, and this force causes the transverse rod 124, the standards 122 and the connected pairs of L-shaped brackets 110, 112 to pivot downwardly about their respective stub shaft 104 to assume the dotted line positions thereof as illustrated in FIGURE 10. The hydraulic cylinders 130 will also pivot about their respective pivot connections 138, 142 to assume their dotted line positions shown in the last named figure.

Referring again to FIGURE 9 of the drawings, it is again pointed out that with the links 156 locked between the lower ends of the plates 126 and stop bars 164, there can be no pivotal movement of the stop lugs 154. However, when the hydraulic cylinders 130 have been actuated to cause their respective piston rods 134 to retract, and as the L-shaped brackets 110, 112 pivot downwardly as described above, the outer free ends of each pair of links 156 will escape from beneath the adjacent lower ends of their associated plates 126. Now if a force is exerted on the plates 154, the same will pivot from their upright operative position shown in full lines in FIGURE 9 to their dotted line inoperative position shown in FIGURE 10, and this pivotal movement of the stop lugs 154 will, in turn, cause the corresponding pivotal movement of the free ends of the pairs of links 156 causing the latter to assume their dotted line positions of FIGURE 10. It will be further understood that upon the removal of the applied force to the lugs 154, the weighted and unbalanced condition of the links 156 and associated plates 154 as a consequence of the obtuse angle A will cause the links 156 and their associated stop lugs 154 to pivot in a clockwise direction, reference being made to FIGURE 10, to cause these elements to assume their respective full line positions shown in FIGURE 9.

In carrying out the teachings of this invention, it is preferable but not essential that the shafts 120A of the rollers 120 be contained in a common plane downwardly inclined toward a normally horizontal ground line G from their respective pivotal connections at 104. The reason underlying this construction will be made more apparent below.

The innermost ones of the rollers 120 are in spaced, parallel juxtaposition relative to one end of a second series of cylindrical rollers here designated by reference numeral 170. These rollers 170 are carried on shafts 170A (see FIGURE 10), the opposed ends of which are supported on the lower chassis side frame members 24, 26 and paralleling side walls 172 of a pair of elongated angle irons 174. The adjacent pair of forward ends of the angle irons 174 may be fixedly connected to the front cross frame member 28, and their opposed rear ends may be supported on the cross rods 30, reference again being made to FIGURE 10. Again, the longitudinal axes of the shafts 170A are preferably contained in a common plane, and this plane is preferably coincident with the common plane of the longitudinal axes of the shafts 120A when the pairs of brackets 110, 112 are in their respective elevated full line positions of FIGURES 9 and 10.

Referring now more specifically to FIGURE 4 of the drawings, reference numeral 176 designates one of a plurality of cylindrical rollers which are mounted at desired longitudinally spaced intervals relative to each of the chassis side frame members 24, 26. Each of the rollers 176 has an inner side portion which slightly overhangs the conveyor path of the rollers 170, and each of the rollers 176 is mounted on a shaft 176A for rotation about a normally vertical axis. Any suitable means may be employed to mount the opposed ends of the shafts 176A, and in the construction shown in FIGURE 4, it is proposed that the lower end thereof be fixedly connected on the upper end of each of the longitudinally extending chassis side frame members 24, 26 while their opposed upper ends are mounted on flanges 178 which are fixedly secured to and project laterally from each of the upright support members 32. The function of these rollers 176 will be more fully detailed below.

This invention contemplates the provision of fork lift means here designated by the general reference numeral 180 (see FIGURES 4 and 5). To this end, each of the lower chassis side frame members 24, 26 is provided at its forward end with a longitudinally extending base plate 182. Mounted on each base plate 182 intermediate the ends thereof is an upright substantially U-shaped channel member 184 having a bight 186 from the longitudinally extending marginal edges of which laterally project side walls 188, 190. The upper ends of the channel members 184 are fixedly secured to the adjacent ends of the upper chassis side frame members 34, 36 and to the transversely extending front cross frame member 38 (see FIGURE 4). The U-shaped channel members 184 are disposed in laterally spaced and confronting parallel relationship relative to one another and open towards each other.

At 192 is designated a substantially open U-shaped fork lift frame which includes as component elements thereof an inverted substantially U-shaped channel member 194 comprising the base or bight of the frame 192, the opposed ends of the channel member 194 being fixedly connected to the bights 196 at the lower ends of a pair of upright channel shaped members 198 forming the arms of the U-shaped fork lift frame 192. Each of the bights 196 is provided with longitudinal extending side walls 200, 202 at their respective marginal edges, and it will be understood from the drawings that each of the arms 198 open away from one another.

Bolts or other suitable fastening means 204 are employed to fixedly secure to each of the bights 196 a pair of vertically spaced substantially rectangular mounting plates 206 from each of which laterally project a shaft 208 on which are rotatably mounted tracking wheels 210. As is clearly seen in FIGURE 5, each of the tracking wheels 210 is received within the adjacent one of the channel members 184 with the side walls 188, 190 thereof disposed at diametrically opposed relationship relative thereto. The diameters of the tracking wheels 210 are, for practical reasons, less than the distance between the confronting sides of the side walls 188, 190. The tracking wheels 210 are, thus, freely rotatable within their respective channel members 184 as the fork lift frame 192 is reciprocated.

To the side wall 212 of the channel member 194 forming the bight of the fork lift frame 192 is fixedly secured one of the ends of a plurality of elongated substantially flat rectangular tines 214. The tines 214 are longitudinally spaced relative to the side wall 212 and the other ends thereof extend in parallelism with respect to one another and in parallel relationship relative to the normally horizontal ground plane line G.

To each of the channel shaped arms 198 adjacent the upper ends thereof is fixedly connected a laterally and forwardly projecting lift plate 216. As is seen in FIGURE 4 of the drawings, the lift plates 216 are normally disposed in vertically spaced relationship relative to the base plates 182 at each respective side of the machine 20 and receive therebetween a second pair of hydraulic cylinders here bearing reference numeral 218. Each of the hydraulic cylinders 218 includes a conventional casing 220 having its lower end fixedly secured by conventional means to the adjacent base plate 182. The free end of each of the piston rods 222 of the hydraulic cylinders 218 are releasably connected by bolts 224 in the open lower end of the sleeve 226, the upper end of each of the latter being fixedly connected on the adjacent lift plate 216 to depend therefrom. Conduits 228, 230 connect the opposed ends of each of the casings 220 in a conventional hydraulic fluid system or circuit controlled by valving means to which reference will be further made below. In view of the obviousness of the operation of the fork lift frame 192, the explanation thereof is here omitted.

Reference numeral 232 designates, in general, fork lift transfer conveyor apparatus which is mounted on the forward end of the machine 20. The apparatus 232 includes a pair of laterally spaced elongated and substantially parallel angle members 234 each of which is provided with a normally upright side wall 236 (see FIGURE 4) and normally horizontal bottom wall 238. U-shaped brackets 240 are fixedly secured to the bottom walls 238 at longitudinally spaced intervals, and as is seen in the last mentioned figure, each of the brackets rotatably support a roller 242 mounted for rotation about the normally horizontal shaft 244. If desired, each of the angle members 234 may have fixedly secured to their respective side walls 236 a plurality of upright brackets 246 in which are mounted vertically extending shafts 248, each of the latter carrying thereon a roller 250. It will be understood that each of the rollers 250 have portions thereof which overhang the conveyor pathway as outlined by the rollers 242, and also serve a purpose and function to be described infra.

The fork lift transfer conveyor apparatus 232 further includes a pair of inverted substantially U-shaped frames 252, there being one frame 252 for each angle member 234. Each frame 252 includes an elongated bight member 254, from the opposed ends of which depend identically constructed arms 256. The arms 256 each include upper and lower arm portions 256A, 256B, respectively, having adjacent ends rigidly connected to a hollow cylindrical collar 258 at substantially diametrically opposed sides thereof. To serve a function to be described below, the upper and lower arm portions 256A, 256B, of each arm 256 radiate from their respective collars 258 to form an obtuse angle therebetween with the inwardly facing angles being somewhat less than a straight angle.

The collars 258 on each pair of adjacent arms 256 are aligned with one another and receive therethrough an elongated substantially hollow cylindrical shaft 260. For reasons which will become apparent below, the collars 258 and consequently their associated arms 256, are rotatably journalled on the shafts 260 and stop collars 262 may be fixedly connected on each of the shafts 260 in abutting relationship with respect to the opposed ends of the collars 258 to prevent axial shifting thereof relative to their respective shafts 260. Obviously, other means may be utilized to prevent the unwanted axial movement of the collars 258 relative to the shafts 260.

Each shaft 260 has a rearwardly projecting end portion 264 which is fixedly secured by conventional means to the adjacent bight portion 186 of the upright U-shaped channel members 184. Additional rigidity and stability is obtained for each of the shafts 216 by connecting a truss plate 266 therewith and with the adjacent one of the bights 186.

Each of the shafts 260 terminates in a forward end portion 268 (see FIGURE 2) which is fixedly connected intermediate the ends of a pair of normally upright elongated brace members 270, the upper ends of the latter being fixedly connected together by means of the transverse brace member 272. The brace members 270, 272 constitute reinforcing means for the forward end of the fork lift transfer conveyor apparatus 232.

Reference numeral 274 again designates a conventional hydraulic cylinder (see FIGURES 1 and 3) which, in this instance, is provided with a casing 276 from the opposed ends of which longitudinally project a pair of connected reciprocable piston rods 278, 280. As is seen in the several figures of the drawings, the outer ends of each of the piston rods 278, 280 are pivotally connected at 282 to the bight members 254 at the opposed sides of the machine 20. The casing 276 is connected via conduits 284, 286 in a fork hydraulic system or circuit again powered by the motor or engine 78 and valve controlled in a manner to be described. However, the operation of the hydraulic cylinder 274 is such that upon admission of hydraulic fluid to the casing 276 through one of the conduits 284, for example, the piston rods 278, 280 move in directions away from one another, and admission of the hydraulic fluid through the conduit 286 will cause the piston rods 278, 280 to move towards one another.

The valve control means 100 comprises a bank of valves, 288, 290, 292, each having a control lever 294, 296, and 298, respectively, which are manually operable by the operator of the machine 20. The arrangement and disposition of the several valves is a matter of design and convenience but for the purpose of explanation, let it be assumed that the conduits 166, 168 connect to the valve 292, and the conduits 284, 286 connect to the valve 290, and the conduits 230, 232 are connected with the valve 288.

Reference numerals 300 each designate a conventional fruit harvesting bin and as such each is provided with a plurality of transversely extending elongated substantially rectangular ground engaging skids 302. As such, the skids 302 maintain the main body portion of their respective bins 300 at an elevated position above a ground plane G. As has been mentioned above, much difficulty is encountered in the manual handling of such bins due to their weight and size, and makeshift fork lifting equipment which has sometimes been heretofore employed in the picking up of the filled bins and transfer to a designated station has been most ineffective. All such handling difficulties have been overcome, however, through the use of machine 20, the operation of which will now be immediately described.

Figure 2:
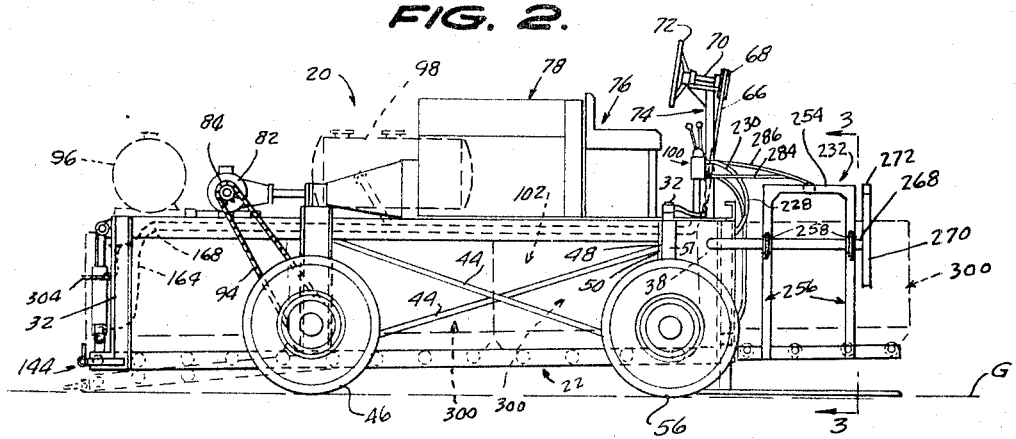
FIGURE 2 is a side elevational view of the machine shown in FIGURE 1.
Figure 3:
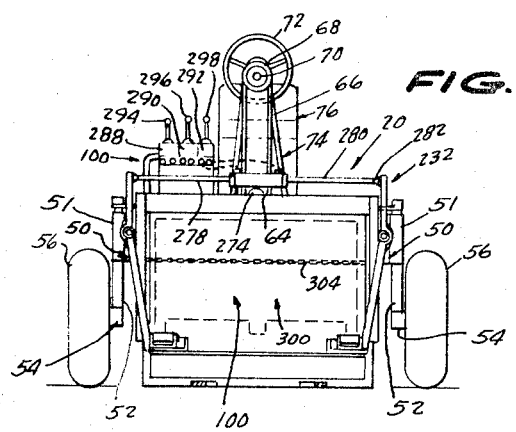
FIGURE 3 is an end view thereof, partly in cross section, FIGURE 3 being taken substantially on the vertical plane of line 3—3 of FIGURE 2, looking in the direction of the arrows.

Assuming that one or more of the bins 300 are filled and are resting on the ground G as shown in FIGURE 6, the operator of the machine 20 will drive the same into proximity with respect thereto. Assuming that the tines 214 are in their lowermost position as shown in FIGURE 2 of the drawings, the operator will manipulate the machine 20 in such manner as to cause the tines 214 to engage below the main body portion of one of the bins 300 between a pair of adjacent skids 302. At this time the operator has moved the control lever 296 for the valve 290 in such manner as to cause the hydraulic cylinder 274 to operate and effect the retraction of the piston rods 278, 280 whereby the arms 256 have assumed their respective positions shown in FIGURE 6 of the drawings. The rollers 240 are consequently displaced laterally from the adjacent ends of the bin 300 which is engaged by the tines 214.

The operator now moves the control lever 294 of the valve 288 to cause the actuation of each of the hydraulic cylinders 218 forcing the extension of their respective piston rods 222. This, in turn, causes the frame 192 and the connected tines 214 to be elevated from their lowermost positions shown in FIGURES 2 and 6 to a point spaced vertically above the rollers 242. Thereafter, the operator again actuates the control lever 296 to effect actuation of the hydraulic cylinder 274 in such a manner as to cause its piston rods 278, 280 to move in directions away from one another, thereby effecting a pivotal movement of the U-shaped frames 252 on their respective shafts 260 forcing the lower arm portions 256B on the arms 256 to pivot towards one another, thereby moving the rollers 242 into position below the outermost ones of the skids 302. The rollers 242 are thus moved from their positions shown in FIGURES 6 and 7 to their respective positions shown in FIGURE 8.

The operator then again manipulates the lever 294 of the valve 288 to cause actuation of the hydraulic cylinders 218 in such a manner as to effect a lowering of the tines 214 to a position such as is shown in FIGURE 8 at which time the skids 302 at the outermost ends of the bin 300 now rest firmly on the rollers 242. Due to the angle of inclination of the three series of rollers 120, 170 and 242, the first of the bins 300 will traverse these rollers in the reverse order named under the influence of gravity and will come to rest in abutting engagement against the stop lugs 154. It is conceivable, of course, that the angle of inclination of the series of rollers would not be sufficiently great so as to cause the movement of each of the bins under the influence of the force of gravity as described above and under such circumstances, the same movement can be effected by the exertion of an external force by an attendant to the machine 20.

The operator then manipulates the machine 20 to the next one of the bins 300 whereupon the tines 214 are again lowered in the manner described above and the operation is repeated. The bins are picked up successively until the entire compartment 100 has been filled, and the final bin 300 (see FIGURE 2) may be loaded on the machine 20 and carried on the rollers 242. If desired, chain means 304 may be extended across the outer side of the first of the bins 300 (see FIGURE 3) with the opposed ends of the chain 304 detachably connected to the rearmost ones of the support elements.

The loaded machine 20 is now driven to a predesignated unloading station with the tines 214, of course, moved to an elevated position above the ground plane G and the chain 304, if utilized, is then disconnected. Upon arrival, the operator will then manipulate the lever 298 of the valve 292 to cause actuation of the hydraulic cylinders 130. The actuation is such as to effect the movement of the cylinders 130 from their full line positions shown in FIGURES 9 and 10 to their dotted line position of FIGURE 10, this operation causing the L-shaped brackets 110, 112 at each side of the chassis 22 to move downwardly to assume their respective dotted line positions shown in FIGURE 10, all as described above. The first of the bins 300 will now slide over the rollers 120 and across the abutment blocks 154 to come to rest, partially on the ground G. The operator now drives the machine 20 forwardly to disengage the rollers 120 from the under side of the first of the ground engaged bins 300 leaving the same at this point. The next succeeding bins are discharged from the apparatus 20 in exactly the same manner.

Again it is recognized that under all circumstances the bins 300 may not gravity feed over the described series of rollers. This failure is easily met, however, by the exertion of but a slight force by an attendant upon the bins 300 to cause their movement over the roller series.

When the last of the bins 300 has been discharged from the machine or device 20 in the manner described supra, the L-shaped brackets 110, 112 at the opposed sides of the machine 20 will pivot upwardly from their dotted line position of FIGURE 10 to their full line positions of FIGURE 9, and the links 156 will once again lock beneath the lower ends of the upright plates 126, and the machine 20 is again ready for operation. The flexible chain 304 may again be extended across the outer side of the first of the bins 300 to be loaded with the ends of the flexible chain 304 releasably connected to the rearmost support members 32, all as described above. While this constitutes an additional safety feature, under ordinary operation it is unnecessary as the stop lugs 154 will serve adequately to prevent the inadvertent and/or accidental discharge of the bins 300.

Having described and illustrated one embodiment of this invention in detail, it will be understood that the same is offered merely by way of example, and that this invention is to be limited only by the scope of the appended claims.

What is claimed is:

1. A bin carrying machine for a plurality of bins each having opposed ends and a bottom side, said machine comprising:
    a wheel supported chassis having a pair of opposed front and rear ends,
    conveyor means on said chassis, said conveyor means including a movable and a fixed section extending substantially from said rear end to said front end of said chassis,
    said movable section having one end pivotally mounted intermediate said chassis ends with the opposed end movable relative to said rear end of said chassis and into ground engagement,
    means releasably locking said movable section on said chassis in an elevated position above the ground, and
    bin engaging and lifting means on said front end of said chassis to lift one of said bins substantially to the height of said fixed conveyor section.

2. A bin carrying machine as defined in claim 1 and, bin transfer means mounted on said front end of said chassis adjacent said lifting means to receive said one bin from said bin engaging and lifting means for transfer onto said fixed section of said conveyor means.

3. A bin carrying machine as defined in claim 1 wherein:
    said conveyor means on said chassis comprises a plurality of series of rollers, there being at least one series of rollers extending in juxtaposition relative to each side of said chassis.

4. A bin carrying machine as defined in claim 2 wherein:
    said transfer means includes conveyor means.

5. A bin carrying machine as defined in claim 2 wherein said transfer means includes a series of rollers aligned with and forming extensions of said roller conveyor means at, respectively, the opposed sides of said chassis.

6. A bin carrying machine as defined in claim 1 wherein:
    said chassis includes a pair of elongated substantially parallel side frame members extending between said front and rear ends thereof,
    said movable section of said conveyor means comprising bracket means for each chassis side frame member with each of said bracket means having front and rear ends,
    means pivotally connecting the adjacent front ends of said bracket means on, respectively, the adjacent one of said chassis side frame members intermediate the ends thereof and with the adjacent rear ends of said bracket means extending towards the rear ends of said chassis side frame members, said rear ends of said bracket means being normally adjustable relative to said chassis side frame members adjacent the rear ends thereof,
    said releasable locking means cooperating between said rear ends of said bracket means and the rear ends of said chassis side frame members, and
    said conveyor means including a series of rollers mounted on each chassis side frame member and its connected said bracket means.

7. A bin carrying machine as defined in claim 2 wherein:
said bin engaging and lifting means comprises fork lift means engageable with said bottom side of said bin, and
said bin transfer means being engageable with said ends of said bin to receive and transfer said bin from said fork lift means to said conveyor means.

8. A bin carrying machine as defined in claim 7 wherein:
said bin transfer means includes a frame means for each side of said chassis, said frame means each having upper and lower end portions, means pivotally supporting said frame means on the adjacent side of said chassis for pivotal movement of said upper and lower end portions thereof, respectively, simultaneously towards and away from one another,
means connecting said upper end portions of said frame means and selectively operable to effect said pivotal movement thereof, and
a series of roller conveyor means on said roller end portions of each said frame means engageable with said ends of said bin to reecive said bin from said fork lift means when said operable means has been actuated to move said lower end portions of said frame means towards one another.

9. A bin carrying machine as defined in claim 8 wherein:
at least said series of rollers on each of said frame means are arranged in descending order from the outer ends of said frame means to an opposed end thereof disposed adjacent said other ends of said chassis side frame members.

10. A bin carrying machine as defined in claim 9 wherein:
said operable means comprises hydraulic means.

11. A bin carrying machine as defined in claim 10 wherein:
said bin engageable and fork lift means includes a frame mounted for vertical reciprocation on said chassis side frame members, and
selectively operable hydraulic means connected between said fork lift frame means and said chassis side frame members.

12. A bin carrying machine as defined in claim 11 and,
selectively operable hydraulic means connected between said other ends of said bracket means and said one ends of said chassis side frame members.

13. A bin carrying machine as defined in claim 12 and,
power and steering means mounted on said chassis and connected in driving and steering relationship with at least one wheel thereof.

References Cited

UNITED STATES PATENTS 3,335,887   8/1967   Snook _____ 214—84

FOREIGN PATENTS 1,383,028   11/1964   France.

ALBERT J. MAKAY, *Primary Examiner.*

U.S. Cl. X.R.

214—84, 83.26, 518